United States Patent

[11] 3,584,212

[72] Inventor Willy Hansen
 Box 403B, Distillery Road, Warwick, N.Y. 10990
[21] Appl. No. 810,979
[22] Filed Mar. 27, 1969
[45] Patented June 8, 1971

[54] ILLUMINATED SPIRIT LEVEL
 3 Claims, 4 Drawing Figs.
[52] U.S. Cl. .................................................. 240/6.44,
 33/206D, 33/211
[51] Int. Cl. .................................................. G01c 9/32
[50] Field of Search .................................... 33/206.5, 5
 L, 211, 206; 240/6.44

[56] References Cited
UNITED STATES PATENTS

| | | | |
|---|---|---|---|
| 1,251,349 | 12/1917 | Day | 33/206(.5L) |
| 1,626,567 | 4/1927 | Steinbrecht | 33/206(.5L) |
| 2,511,525 | 6/1950 | Bradwell | 33/206(.5) |
| 2,922,874 | 1/1960 | Clerk | 240/6.44 |

Primary Examiner—Leonard Forman
Assistant Examiner—Dennis A. Dearing
Attorney—Joseph Levinson ABSTRACT: An illuminated spirit level is provided having a plurality of spirit level containers mounted therein along with a plurality of light sources for selectively illuminating the spirit level containers. A gravity switch is provided having a movable ball of conductive material which selectively closes normally open contacts to one or more of the light sources in the level depending on the positioning of the level.

PATENTED JUN 8 1971 3,584,212

INVENTOR.
WILLY HANSEN
BY Joseph Levinson
ATTORNEY

3,584,212

ILLUMINATED SPIRIT LEVEL

BACKGROUND OF THE INVENTION

This invention relates to an improved illuminated spirit level.

Craftsman, tradesmen, and do-it-yourselfers encounter a variety of poor to inadequate lighting conditions in their endeavors. Under such conditions, it is difficult, if not impossible, to read a level. It is also not too practical to use matches or flashlights, because the level is usually placed at inconvenient locations which require the free use of at least one hand. To overcome these difficulties, illuminated levels have been proposed. Many of these require complex or fragile switching arrangements which are difficult to operate, easily damaged, or uneconomical in their use of the power source.

It is an object of the present invention to provide an improved illuminated spirit level which selectively illuminates the spirit level containers therein in accordance with the position of level, so that the operator's attention is directed to only those spirit level containers which are pertinent to the particular measurement.

Another object of this invention is to provide an improved illuminated spirit level which is simple in construction and easy to operate.

Still another object of this invention is to provide an improved illuminated spirit level which conserves power when not in use.

SUMMARY OF THE INVENTION

An illuminated spirit level is provided having a body portion with workpiece engaging surfaces and a plurality of openings along the body which contain spirit level indicators. Light sources are positioned in the openings for illuminating the spirit level containers, and a gravity switch means is mounted in the body with a plurality of pairs of conducting members forming normally open switches which are capable of being closed by a movable switch closing member of electrically conducting material. The movable switch closing member selectively illuminates a light source or sources, depending on the position of the body of the level.

DESCRIPTION OF THE PREFERRED EMBODIMENT

Figure 1:
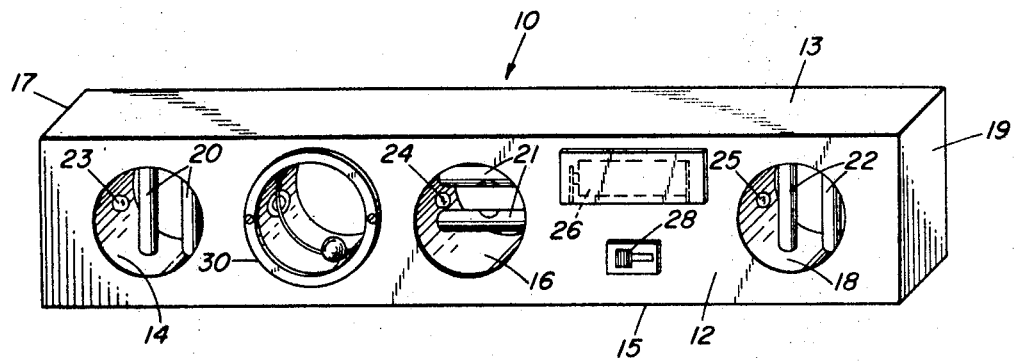
FIG. 1 is an isometric front view of the improved illuminated spirit level embodied in this invention.

Referring now to FIG. 1, there is shown an illuminated spirit level referred to generally with the reference character 10. The level 10 has a body portion 12 with parallel workpiece engaging surfaces 13 and 15, and parallel workpiece engaging end surfaces 17 and 19, which are perpendicular to the surfaces 13 and 15. The body 12 also contains a plurality of spaced openings 14, 16 and 18 which have spirit level containers 20, 21, and 22 respectively, mounted therein. Each of the openings 14, 16 and 18 also have mounted therein light sources 23, 24 and 25, respectively. The light sources function to illuminate their associated spirit level containers. The body 12 of the spirit level 10 also contains a source of potential 26 and a power switch 28, as well as a gravity switch means 30.

Figure 2:
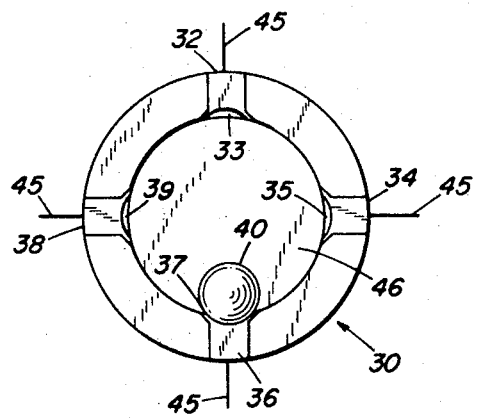
FIG. 2 is a top view of the gravity switch means utilized in the level of FIG. 1.
Figure 3:
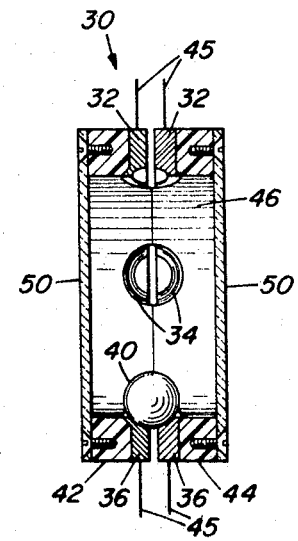
FIG. 3 is a side elevation, partly in section, of the gravity switch means shown in FIG. 2.

The gravity switch means 30, as will best be seen in FIGS. 2 and 3, is formed of an upper body member 44 and a lower body member 42 of insulating material forming a circular chamber 46 therein which is adapted to be closed by transparent windows 50. Four pairs of normally open switch contacts 32, 34, 36 and 38 are disposed about the circular chamber 46 perpendicular to the surfaces 13, 19, 15 and 17, respectively, of the level 10. The switch contacts are made of conductive material and are separated from each other and, normally open. The switch contacts are mounted in the lower and upper body portions 42 and 44 by epoxy or other suitable means. Leads 45 are utilized for making electrical circuit connections to the contacts. A ball 40 of electrical conducting material is positioned in the chamber 46 of the gravity switch means 30. Each pair of switch contacts 32, 34, 36 and 38 are so formed as to provide depressions 33, 35, 37 and 39 therein, respectively, to accommodate and lodge the ball 40 therein to close the set of switch contacts in which the ball 40 is lodged. When the level is not in use and is positioned face up or face down, the ball 40 drops to one of the transparent windows 50, leaving all of the switches in the normally open position.

The gravity switch means 30 is of simple construction, and has a configuration to facilitate continuous and trouble free switching operations. The ball 40 has five rest positions, four of which perform a switching operation and the fifth provides an open position. The pairs of switch contacts are located at 90° intervals, which are perpendicular to the workpiece engaging surfaces of the body member 12. As the level is rotated in its different positions of use, the ball 40 moves to close a different set of switch contacts, depending on the position of the body member. It will be apparent that the circular configuration of the chamber 46, as well as the design of the switch contacts, facilitates this movement in operation. The gravity switch means per se is simple to construct, and electrical connections can be made directly to the separated contact members.

Figure 4:
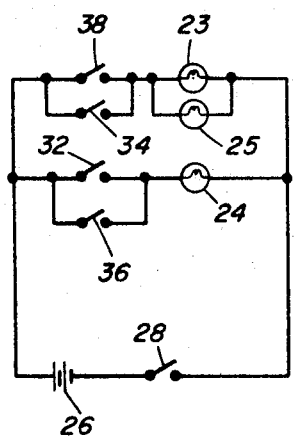
FIG. 4 is a schematic diagram of one form of electric circuit which may be utilized for the illuminated spirit level of this invention.

FIG. 4 shows one form of circuit configuration for the spirit level of this invention, but the invention is not considered limited thereto. A source of potential 26 is connected in series with a manually operable switch 28 mounted on the body portion 12 of the spirit level 10. The switch 28 is provided to inactivate and conserve the source of potential during storage or long periods of nonuse. However, during a given day of use the switch 28 is activated and the source of potential 26 is still not drained when the level 10 is in a faceup or face-down position with the ball 40 resting on one of the transparent windows because none of the switch contacts will be activated in such a position. In the configuration of FIG. 4, switch contacts 38 and 34 are connected in parallel, as are the light sources 23 and 25. The parallel combination of switches 34 and 38 is serially connected to the parallel combination of lamps 23 and 25. A parallel combination of switch contacts 32 and 36 is connected in series with lamp 24, and both of the aforesaid series circuits are connected in parallel across the source of potential 26. Accordingly, the closure of either contact switch 34 or 38 will light lamps 23 and 25, and the closure of switch 32 or 36 will activate the lamp 24. It will be apparent with the four switch contacts, different illumination approaches may be taken. For example, each lamp could have its separate switch contact connected in parallel across the source of potential. In the configuration that is shown in FIG. 1, the lamps are lit for spirit level containers 20 and 22 simultaneously, since they are positioned in the same direction for providing the same level indication. Also, since the spirit level containers 21 are perpendicular to those of 20 and 22, and only a single set are provided with one lamp, two switches are utilized for operating one lamp.

It will be apparent that the gravity switch means provides a very convenient method of selectively illuminating the desired spirit level containers, depending on the position of the level 10 with respect to the work surface. Once the power switch 28 is activated, the operation of the illuminated level 10 is automatic, depending on the positioning of the workpiece engaging surfaces of the level. A rest position is also provided for the gravity switch to conserve power, which makes it unnecessary to continually operate the power switch 28. The level 10 is easily maneuverable, and during operation requires no manual operation, leaving at least one hand free in any level operation, and of course frees both hands when the level is placed on a horizontal surface. The level 10 is also simple to construct without departing greatly from conventional level construction.

I claim:
1. An illuminated spirit level comprising
   a. a rectangular body with two sets of parallel workpiece engaging surfaces which are perpendicular,
   b. a plurality of spaced openings along said body having spirit level containers mounted therein,
   c. a light source positioned in each of said openings for illuminating said spirit level containers when actuated,
   d. gravity switch means having a circular-shaped enclosed chamber mounted in said body and containing a freely movable ball of conducting material, said chamber having a plurality of pairs of conducting members forming normally open switch contacts, said pairs of switch contacts being positioned in said circular chamber at substantially 90° intervals and being generally perpendicular to at least one set of workpiece engaging surfaces, said ball adapted to close any given pair of switch contacts depending on the position of said body,
   e. a source of potential mounted in said body,
   f. circuit means interconnecting said source of potential, said light sources and said switch contacts such that said light sources are selectively illuminated when said ball engages a pair of said switch contacts depending on the position of said body.
2. The illuminated spirit level set forth in claim 1 wherein said pairs of switch contacts are so formed to provide a depression therebetween for lodging said ball therein.
3. The illuminated spirit level set forth in claim 1 wherein said enclosed chamber is enclosed by a pair of transparent windows on which the ball lies when the body of the level is positioned on a surface other than a workpiece engaging surface, whereby all the switch contacts are open and the level is not illuminated.